United States Patent [19]

Boles

[11] Patent Number: 4,723,124
[45] Date of Patent: Feb. 2, 1988

[54] EXTENDED SAR IMAGING CAPABILITY FOR SHIP CLASSIFICATION

[75] Inventor: Sol Boles, Syosset, N.Y.

[73] Assignee: Grumman Aerospace Corporation, Bethpage, N.Y.

[21] Appl. No.: 842,459

[22] Filed: Mar. 21, 1986

[51] Int. Cl.[4] ............................................ G01S 13/90
[52] U.S. Cl. ..................................... 342/25; 342/179; 342/196
[58] Field of Search ........................ 342/25, 27, 28, 55, 342/61–63, 66, 67, 69, 104, 106–109, 111–116, 133, 146, 156, 179, 184, 192, 193, 195–197; 364/516, 517

[56] References Cited

U.S. PATENT DOCUMENTS

| | | | |
|---|---|---|---|
| 3,005,195 | 10/1961 | Coburn et al. | 342/180 |
| 3,044,058 | 7/1962 | Harris | 342/180 |
| 3,453,619 | 7/1969 | Wright | 342/113 |
| 3,602,702 | 8/1971 | Warnock | 364/522 |
| 3,792,423 | 2/1974 | Becker et al. | 342/180 |
| 4,095,223 | 6/1978 | Howard | 342/179 |
| 4,101,891 | 7/1978 | Jain et al. | 342/25 |
| 4,125,862 | 11/1978 | Catano | 358/140 |
| 4,206,461 | 6/1980 | Pease et al. | 342/159 |
| 4,245,321 | 1/1981 | Gennetten | 364/521 |
| 4,443,797 | 4/1984 | Cramp et al. | 342/185 |
| 4,471,357 | 9/1984 | Wu, et al. | 342/25 |
| 4,509,048 | 4/1985 | Jain . | |
| 4,527,161 | 7/1985 | Wehner | 342/179 X |
| 4,546,354 | 10/1985 | Boles | 342/179 |
| 4,546,355 | 10/1985 | Boles | 342/179 |
| 4,549,184 | 10/1985 | Boles | 342/25 |
| 4,563,686 | 1/1986 | Boles | 342/25 |

OTHER PUBLICATIONS

Ebert, Heinz, AGARD Conference Proceedings No. 197 on New Devices, Techniques and Systems in Radar, Jun. 14–17, 1976.
De Martino, et al., Conference. Electronic Systems for Remote Sensing and Ranging, Mar. 10–12, 1980, pp. 133–142.

Primary Examiner—T. H. Tubbesing
Assistant Examiner—Bernarr Earl Gregory
Attorney, Agent, or Firm—Scully, Scott, Murphy & Presser

[57] ABSTRACT

Capability is provided using coherent synthetic aperture radar (SAR) techniques for substantially extending the useful range for producing 3 scaled high resolution orthogonal image projections on a CRT of a translating ship under the influence of rotational motions arising from sea state conditions, for the purpose of ship classification and weapon delivery from an airborne platform at long stand-off ranges. This advantage is brought about by determining image coordinates on the basis of range, doppler, and doppler rate measurements of individual scatterers and from ship angular rotational velocities derived from a weighted multivariate regression solution to doppler processed interferometric azimuth and elevation angle measurements of all significant ship target scatterers. In this manner, the image degradation suffered by plotting angular measurements directly, whose location accuracies are known to deteriorate rapidly with increased range due to high signal-to-noise requirements, is circumvented.

12 Claims, 5 Drawing Figures

EXTENDED SAR IMAGING CAPABILITY FOR SHIP CLASSIFICATION

BACKGROUND OF THE INVENTION

1. Field of the Invention

The present invention relates to synthetic aperture radar (SAR) techniques and more particularly, to a method and apparatus for providing real-time high resolution SAR imagery of a translating ship under the influence of rotational motions from sea state conditions.

2. Prior Art

Prior art airborne synthetic aperture radar systems have the capability for producing a high resolution image of stationary ground targets by virtue of the rotational motion of the SAR with respect to the target field. High resolution in both range and cross-range (azimuth) directions are achieved with short-pulse radar techniques for range resolution, and by digital signal doppler processing for azimuth resolution, so as to produce a two-dimensional image. The application of such known SAR processing techniques to a ship at sea, however, can readily produce distorted and improperly focused ship imagery, precluding ship recognition, because of ship rotational motions brought about by sea state conditions.

Systems for ameliorating some of the adverse effects brought about by ship rotational motions are described in the commonly assigned U.S. patents of Sol Boles, entitled "Range/Azimuth Ship Imaging For Ordnance Control", U.S. Pat. No. 4,546,354, "Range/Azimuth Elevation Ship Imaging for Ordnance Control", U.S. Pat. No. 4,546,355, and "Range/Doppler Ship Imaging For Ordnance Control", U.S. Pat. No. 4,563,686, filed concurrently on June 17, 1982, the disclosures of which are incorporated herein by reference. The above referenced Boles patents all describe methods and apparatus for generating real-time high resolution Synthetic Aperture Radar (SAR) imagery from an airborne platform of a translating ship under the influence of roll, pitch, and yaw motions characteristic of sea state conditions, for the purpose of ship classification and the subsequent delivery of command guided weapons from stand-off ranges. The U.S. Pat. No. 4,546,354 provides an undistorted two-dimensional image of the ship from a direct plot of range versus interferometrically determined azimuth angle of all essential scatterers comprising the ship. The U.S. Pat. No. 4,563,686 on the other hand, provides an improvement in image definition, as well as performance to greater ranges, by displaying range versus doppler, after removal of the "isodop" type distortions (brought about by the non-orthogonality of constant doppler contours with respect to constant range contours), inherent in the formed range/doppler image. The U.S. Pat. No. 4,546,355 patent discloses a unique processing implementation for removing any restrictions due to ship scatterer elevation on the formation of a scaled high resolution image. This advantage is brought about by utilizing elevation angle, as well as azimuth angle, interferometric techniques in conjunction with SAR signal processing techniques.

Whereas the U.S. Pat. No. 4,546,355 patent provides for three scaled high resolution orthogonal image projections of a ship of generalized shape without restrictions, there is need to substantially extend the useful range of such imagery. This is desirable to circumvent the image degradation suffered by plotting angular measurements directly when using the technique underlying the U.S. Pat. No. 4,546,355 system whose location accuracies are known to deteriorate rapidly with increased range due to high signal-to-noise requirements.

SUMMARY OF THE INVENTION

In accordance with the present invention, capability is provided, using coherent synthetic aperture radar (SAR) techniques, for substantially extending the useful range of producing three scaled high resolution orthogonal image projections on a CRT of a translating ship under the influence of rotational motions arising from sea state conditions, for the purpose of ship classification and weapon delivery from an airborne platform at long stand-off ranges. This advantage is brought about by determining image coordinates on the basis of range, doppler, and doppler rate measurements of individual scatterers and from ship angular rotational velocities derived from a weighted multivariate regression solution to doppler processed interferometric azimuth and elevation angle measurements of all significant ship scatterers. In this manner, the image degradation suffered by plotting angular measurements directly, whose location accuracies are known to deteriorate rapidly with increased range due to high signal-to-noise requirements, is circumvented.

The method of the present invention for generating three orthogonal high resolution SAR images includes utilizing range, velocity and acceleration of ship scatterers and estimates of ship rotational velocities and rotational velocity rates to determine scatterer coordinates. The scatterer range, velocity and acceleration are determined by polynomial curve fitting of quantized scatterer range and doppler processed frequency measurements over a prescribed tracking time interval. In addition, smoothed estimates of ship rotational velocities and rotational velocity rates are determined by polynomial curve fits to the regression estimates over a prescribed tracking interval.

DESCRIPTION OF THE PREFERRED EMBODIMENT

Figure 1:
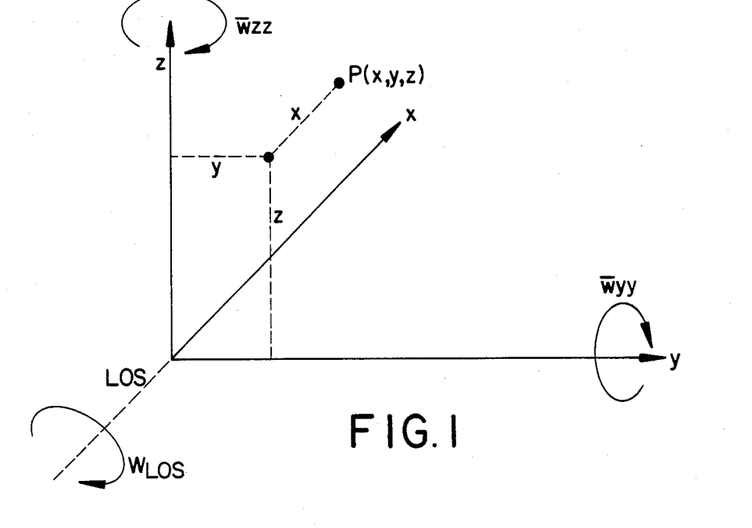
FIG. 1 illustrates the net orthogonal rotational velocity components in a three coordinate frame.

Referring to FIG. 1, $\overline{W}_{zz}$, $\overline{W}_{yy}$, and $W_{LOS}$ represent the net orthogonal rotational velocity components referenced to a coordinate frame which includes the line-of-sight (LOS) direction drawn from aircraft antenna phase center to the center of ship rotation, as well as azimuth and elevation angle measurement directions. For each point scattered, P (x, y, z), the net doppler shift, f, resulting from the indicated relative rotations is given by $$f = \frac{2}{\lambda} (y \, \overline{W}_{zz} - z \, \overline{W}_{yy}) \tag{1}$$

where $\lambda$ = radiated wavelength.

The observed change in doppler frequency of the scatterer, df, after a finite time interval, dt, is found from equation (1), $$\frac{\lambda}{2} df = y(d\overline{W}_{zz}) + (\overline{W}_{zz}) dy - z (d\overline{W}_{yy}) - (\overline{W}_{yy}) dz \tag{2}$$

where $d\overline{W}_{zz}$ and $d\overline{W}_{yy}$ are differential $\overline{W}_{zz}$ and $\overline{W}_{yy}$ rotational velocities and where the differential coordinate values, dz and dy are found from, $$dz = -(\overline{W}_{yy} \times dt + W_{LOS} y \, dt). \tag{3}$$

$$dy = x\overline{W}_{zz} dt + zW_{LOS} dt. \tag{4}$$

Combining equations (1), (2), (3), and (4), the coordinate locations $x_j$, $y_j$, and $z_j$ of the $j^{th}$ scatterer, are found from, $$x_j = R_j \tag{5}$$

$$y_j = -\left(\frac{\alpha \overline{W}_{yy}}{\delta}\right) R_j + \left(\frac{\gamma}{\delta}\right) V_j - \left(\frac{\overline{W}_{yy}}{\delta}\right) A_j \tag{6}$$

$$z_j = -\left(\frac{\alpha \overline{W}_{zz}}{\delta}\right) R_j + \left(\frac{\beta}{\delta}\right) V_j - \left(\frac{\overline{W}_{zz}}{\delta}\right) A_j \tag{7}$$

where,
$\alpha = \overline{W}_{yy}^2 + \overline{W}_{zz}^2$,
$\beta = \overline{W}_{zz} + \overline{W}_{yy} W_{LOS}$,
$\gamma = \overline{W}_{yy} - \overline{W}_{zz} W_{LOS}$,
$\delta = \beta \overline{W}_{yy} - \gamma \overline{W}_{zz}$.

$R_j$ is the scatterer range referenced to the coordinate system origin, and $V_j$ and $A_j$ are scatterer velocity and acceleration values obtained from frequency and frequency rate measurements, $$V_j = -\frac{\lambda}{2} f_j \tag{8}$$

$$A_j = -\frac{\lambda}{2} \dot{f}_j. \tag{9}$$

Accordingly, the scatterer locations are determined after the rotational parameters, $\overline{W}_{yy}$, $\overline{W}_{zz}$, $W_{LOS}$, and the time derivatives, $\dot{\overline{W}}_{zz}$ and $\dot{\overline{W}}_{yy}$, are known.

It is shown in the application of Boles, entitled "Range/Azimuth/Elevation Ship Imaging For Ordinance Control", that the doppler shift, f, associated with a ship scatterer referenced to the coordinate frame of FIG. 1, is given by $$f = \frac{2}{\lambda} (-\epsilon_{v'xx} + V'_{yy}\overline{\Delta \theta} + V'_{zz}\Delta \eta) \tag{10}$$

Where $\epsilon_{v'xx}$ is the residual velocity error after motion compensation for relative displacement between ship and aircraft along the line-of-sight direction, $\overline{\Delta \theta}$ and $\Delta \eta$ are azimuth and elevation angles, measured positively along the y and −z directions, respectively, and where $V'_{yy} = \overline{W}_{zz} R_o$, $V'_{zz} = \overline{W}_{yy} R_o$, and $R_o$ is the slant range along boresight to the focus point (ship center of rotation).

Equation (10) suggests that the rotational velocity components, $\overline{W}_{yy}$ and $\overline{W}_{zz}$, (as well as the motion-compensation error, $\epsilon_{v'xx}$) for use in solving for the scatterer y and z coordinates as expressed by Equations (6) and (7), can be ascertained from the over-determined set of measurement points, each comprised of doppler, azimuth, and elevation angle measurements. Equation (10) is rearranged to read, $$\Delta \eta = \left(\frac{\lambda}{2V'_{zz}}\right) f - \left(\frac{V'_{yy}}{V'_{zz}}\right) \overline{\Delta \theta} + \left(\frac{\epsilon_{v'xx}}{V'_{zz}}\right). \tag{11}$$

It is to be noted that the scatterer frequency, azimuth, and elevation angles are determined from post (Fourier Transform) signal processing based on standard interferometric or phase monopulse antenna arrangements. For example, for an interferometric implementation, $$\overline{\Delta \theta} = \sin^{-1} [(\lambda / 2\pi d_a) \phi_a] \tag{12}$$

and, $$\Delta \eta = \sin^{-1} [(\lambda / 2\pi d_e) \phi_e], \tag{13}$$

where, $d_a$ and $d_e$ are azimuth and elevation interferometer baseline distances, and $\phi_a$ and $\phi_e$ are azimuth and elevation phase shift measurements.

Figure 2:
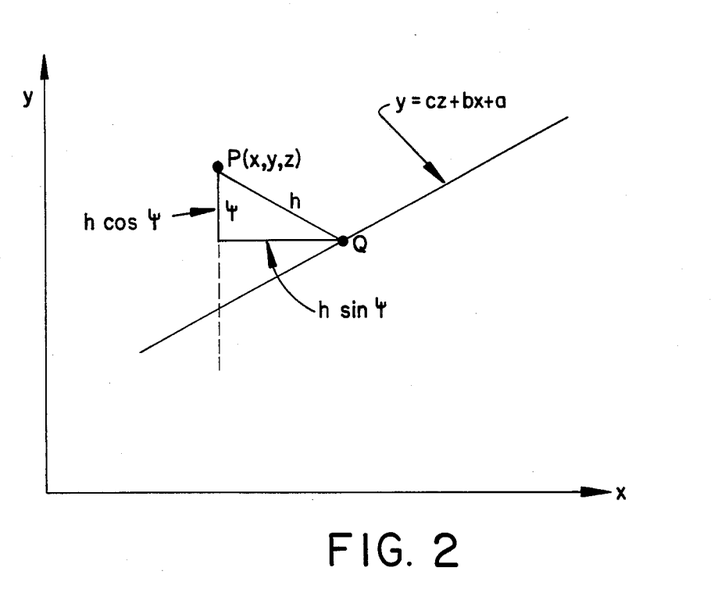
FIG. 2 illustrates, in the y-x coordinate plane, the intercept of a planar solution of the equation for rotational velocity components dependent upon doppler frequency, elevation angle and azimuth angle measurements.

Equation (11) is of the form, $$y = cz + bx + a, \tag{14}$$

where c, b, and a are directly relatable to the quantities sought, ($\epsilon_{v'xx}$, $V'_{yy}$, $V'_{zz}$) and which are solved for by performing a least squares multivariate regression fit to the over-determined set of frequency, azimuth, and elevation angle coordinates. In performing this process, attention must be paid to the fact that azimuth and elevation angles are noisy variables otherwise excessive bias errors in estimated parameters may result. Also, although frequency is quantized, the regression solution is not significantly altered by assuming error free frequency measurements. FIG. 2 depicts the intercept of the planar solution to Equation (14) in the y-x coordinate plane for an assumed value of frequency (z), and a measurement point P (x, y, z). In order for the planar solution, $y = cz + bx + a$, to represent a least squares minimization of the sums of the weighted squares of the residuals computed for all data points to the solution surface, a direction $\psi$ must be chosen appropriate to achieving this minimization. From FIG. 2, the distance h from the measurement point P (x, y, z) to its adjusted location Q lying in the x-y coordinate plane and on the solution curve, can be expressed by, $$h = \frac{y - a - bx - cz}{\cos \psi + b \sin \psi}. \tag{15}$$

The sum of the weighted (residual) squares, F (a, b, c), due to both azimuth and elevation angle measurement errors, is expressed by, $$F(a,b,c) = \Sigma \left[ \left(\frac{h \cos \psi}{\sigma_{el}}\right)^2 + \left(\frac{h \sin \psi}{\sigma_{az}}\right)^2 \right] \tag{16}$$

where azimuth and elevation residual weights are denoted by $1\sigma^2 az$ and $1/\sigma^2 el$ respectively, $\sigma^2 az$ and $\sigma^2 el$ are the variances associated with the respective measurement errors. In order for the sum of the weighted squares to be minimized, $$\frac{\partial F}{\partial a} = 0, \quad \frac{\partial F}{\partial b} = 0, \quad \frac{\partial F}{\partial c} = 0.$$

Upon differentiating, the following equations result, $$a\Sigma w + b\Sigma wx + c\Sigma wz = \Sigma wy \quad (17)$$

$$a\Sigma wr + b\Sigma wxr + c\Sigma wzr = \Sigma wyr \quad (18)$$

$$a\Sigma wz + b\Sigma wxz + c\Sigma wz^2 = \Sigma wyz \quad (19)$$

where w is a relative weight proportional to scatterer signal power, and, $$r = y \sin \psi + x \cos \psi. \quad (20)$$

(Only those terms linear in a, b, c are retained in equation (18), without loss in generality.)

The angle $\psi$ is also determined so as to minimize the weighted squares, thereby requiring that $\partial F/\partial \psi = 0$. Upon differentiation, $$\psi = \tan^{-1}\left[b\left(\frac{\sigma^2 az}{\sigma^2 el}\right)\right]. \quad (21)$$

The solution to equations (17), (18), and (19) is, $$\hat{a} = \frac{\begin{array}{c}\Sigma w_i y_i[\Sigma w_i x_i r_i \Sigma w_i z_i^2 - \Sigma w_i z_i r_i \Sigma w_i x_i z_i] - \\ \Sigma w_i y_i r_i[\Sigma w_i x_i \Sigma w_i z_i^2 - \Sigma w_i z_i \Sigma w_i x_i z_i] + \\ \Sigma w_i y_i z_i[\Sigma w_i x_i \Sigma w_i z_i r_i - \Sigma w_i z_i \Sigma w_i x_i r_i]\end{array}}{D} \quad (22)$$

$$\hat{b} = \frac{\begin{array}{c}\Sigma w_i[\Sigma w_i y_i r_i \Sigma w_i z_i^2 - \Sigma w_i z_i r_i \Sigma w_i y_i z_i] - \\ \Sigma w_i r_i[\Sigma w_i y_i \Sigma w_i z_i^2 - \Sigma w_i z_i \Sigma w_i y_i z_i] + \\ \Sigma w_i z_i[\Sigma w_i y_i \Sigma w_i z_i r_i - \Sigma w_i z_i \Sigma w_i y_i r_i]\end{array}}{D} \quad (23)$$

$$\hat{c} = \frac{\begin{array}{c}\Sigma w_i[\Sigma w_i x_i r_i \Sigma w_i y_i z_i - \Sigma w_i y_i r_i \Sigma w_i x_i z_i] - \\ \Sigma w_i r_i[\Sigma w_i x_i \Sigma w_i y_i z_i - \Sigma w_i y_i \Sigma w_i x_i z_i] + \\ \Sigma w_i z_i[\Sigma w_i x_i \Sigma w_i y_i r_i - \Sigma w_i y_i \Sigma w_i x_i r_i]\end{array}}{D} \quad (24)$$

where, $$D = \left\{\begin{array}{c}\Sigma w_i[\Sigma w_i x_i r_i \Sigma w_i z_i^2 - \Sigma w_i z_i r_i \Sigma w_i x_i z_i] - \\ \Sigma w_i r_i[\Sigma w_i x_i \Sigma w_i z_i^2 - \Sigma w_i z_i \Sigma w_i x_i z_i] + \\ \Sigma w_i z_i[\Sigma w_i x_i \Sigma w_i z_i r_i - \Sigma w_i z_i \Sigma w_i x_i r_i]\end{array}\right. \quad (25)$$

and, $x_i$, $y_i$, $z_i$ are azimuth angle, elevation angle, and frequency coordinates of the $i^{th}$ measurement point, and $w_i$ is a weighting factor proportional to signal power.

Accordingly, from Equations (11) and (14), $$\hat{V}_{zz} = \frac{\lambda}{2\hat{c}} \quad (26)$$

$$\hat{V}_{yy} = -\left(\frac{\lambda \hat{b}}{2\hat{c}}\right) \quad (27)$$

$$\epsilon_{v'xx} = \frac{\lambda \hat{a}}{2\hat{c}}. \quad (28)$$

It is to be noted in Equation (21) that the ratio of azimuth to elevation variances, $\sigma^2_{az}/\sigma^2_{el}$, is a precisely determinable quantity based exclusively on hardware considerations. Equations (20) and (21) also suggest that before the regression solution to equations (22) through (24) can be obtained for $\hat{a}$, $\hat{b}$, and $\hat{c}$, an estimate of the variable "b" (in Equation (21)) must be made. This matter is best dealt with by iteratively varying $\psi$ sufficiently about its roughly expected value, obtaining at each iteration, $\hat{a}$, $\hat{b}$, and $\hat{c}$, from Equations (22) through (24), computing for each iteration the sum of the squares of the residuals from Equations (15) and (16), and then selecting that regression solution for which the residual squared sum is a minimum. Following the estimates of $\hat{V}'_{zz}$, $\hat{V}'_{yy}$, and $\epsilon_{v'xx}$ from Equations (26) through (28), $\overline{W}_{zz}$ and $\overline{W}_{yy}$ for use in Equations (6) and (7) for the scatterer y and z coordinates, are $\hat{V}'_{yy}/R_o$ respectively, and $\epsilon_{v'xx}$ is the line-of-sight velocity error to be used for motion-compensation velocity correction. The estimated rotation producing velocities, $\hat{V}'_{yy}$ and $\hat{V}'_{zz}$ are also used predictively to establish doppler filter bandwidths and filter frequency separations, as well as the coherent integration time, for the formation of the next aperture of prescribed resolution. (See Boles U.S. Pat. No. 4,546,355, "Range/Azimuth/Elevation Ship Imaging For Ordnance Control").

To extend the imaging capability of the system to as great a range as possible, advantage is taken of data smoothing of the derived parameters, $\overline{W}_{yy}$ and $\overline{W}_{zz}$. This is done by performing a least squares polynomial curve fit to the last 6 seconds of derived data for $\overline{W}_{yy}$ and $\overline{W}_{zz}$, of the form, $$Y = a_0 + a_1 t + a_2 t^2 + a_3 t^3 \quad (29)$$

where t denotes time and $a_0$, $a_1$, $a_2$, and $a_3$ are derived from the least squares regression. Since curve fit accuracy is generally greater near the center of the smoothing window than at the ends of the interval, Equations (5) through (7) are applied to a stored aperture which corresponds approximately to the center of this 6 second smoothing window. As time and coherent synthetic apertures advance, so does the imaged aperture advance forward, correspondingly.

The time derivatives, $\dot{\overline{W}}_{yy}$ and $\dot{\overline{W}}_{zz}$, for use in Equations (6) and (7), are obtained from the derivative of Equation (29), $$\dot{Y} = a_1 + 2a_2 t + 3a_3 t^2 \quad (30)$$

evaluated at the time of the designated aperture corresponding to the center of the smoothing window.

Equations (5) through (7) require accurate estimates of range, $R_j$, doppler frequency, $f_j$ and time rate of change of doppler frequency, $\dot{f}_j$ (see also Equations (8) and (9)) for all scatterers to be imaged. The filter outputs of each range bin are subjected to an accurate frequency measuring routine, wherein the ratio of amplitudes from two contiguous filters containing a response is inputted to a pre-determined look-up table (of relative amplitude versus frequency), from which an accurate frequency interpolation is obtained. The amplitudes and frequencies of all such responses over all range bins are stored for a fixed number of apertures (for perhaps 2-3 seconds of data) about a central point in time to be imaged. To assure unambiguous and accurate measurements, responses closer to one another than about 2 doppler filter widths are rejected with appropriate logic.

At this point, associations are made over the stored apertures so as to sort out the foregoing measurements of uniquely identified scatterer responses over the span so that a curve fit can be applied for each. This is done by comparing contiguous responses between all neighboring apertures over the interval, with each such pair subject to prescribed acceptance limits with respect to range, frequency, and amplitude. The resulting ensembles of accepted points are (third degree) polynomial curve fitted to determine frequency at the center of the span; acceleration is determined from the time derivative of the resulting polynomial at the same central point in time. Quantized range for each scatterer at the same central point in time is found to provide sufficient accuracy.

Figure 3:
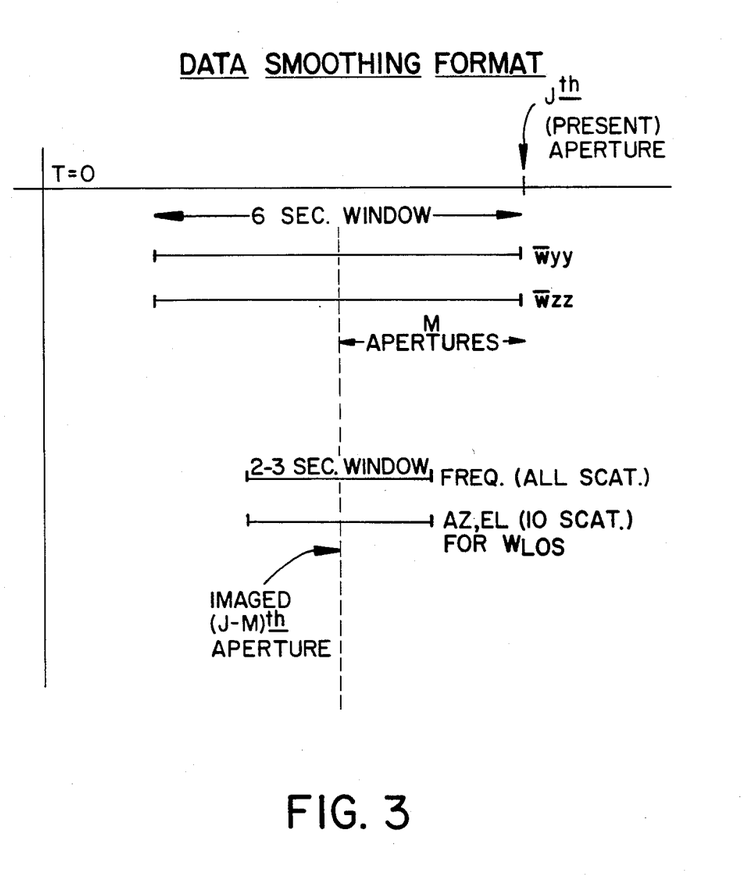
FIG. 3 illustrates the data smoothing format.

FIG. 3 illustrates the format for data smoothing described above.

To obtain $W_{LOS}$ for use in Equations (6) and (7), Equation (3) is rearranged to read, $$W_{LOS} = -\left(\frac{x}{y}\overline{W}_{yy} + \frac{\dot{dz}}{y}\right). \tag{31}$$

Referring to FIG. 1, since x is scatterer range (with respect to ship coordinate origin), y is slant range, $R_0$, times azimuth angle, and $\dot{dz}$ is slant range, $R_0$, times minus the time rate of change of scatterer elevation angle, $W_{LOS}$ can be determined by evaluating Equation (31) for several of the brighter scatterers of the ship target. Accordingly, azimuth and elevation measurements are stored and smoothed for 3 seconds about the time of the aperture designated for imaging using a second degree least squares polynomial curve fit of the form, $$\dot{Y} = a_0 + a_1 t + a_2 t^2 \tag{32}$$

and where the elevation angle time derivative is obtained from $$y = a_1 + 2a_2 t. \tag{33}$$

Figure 4:
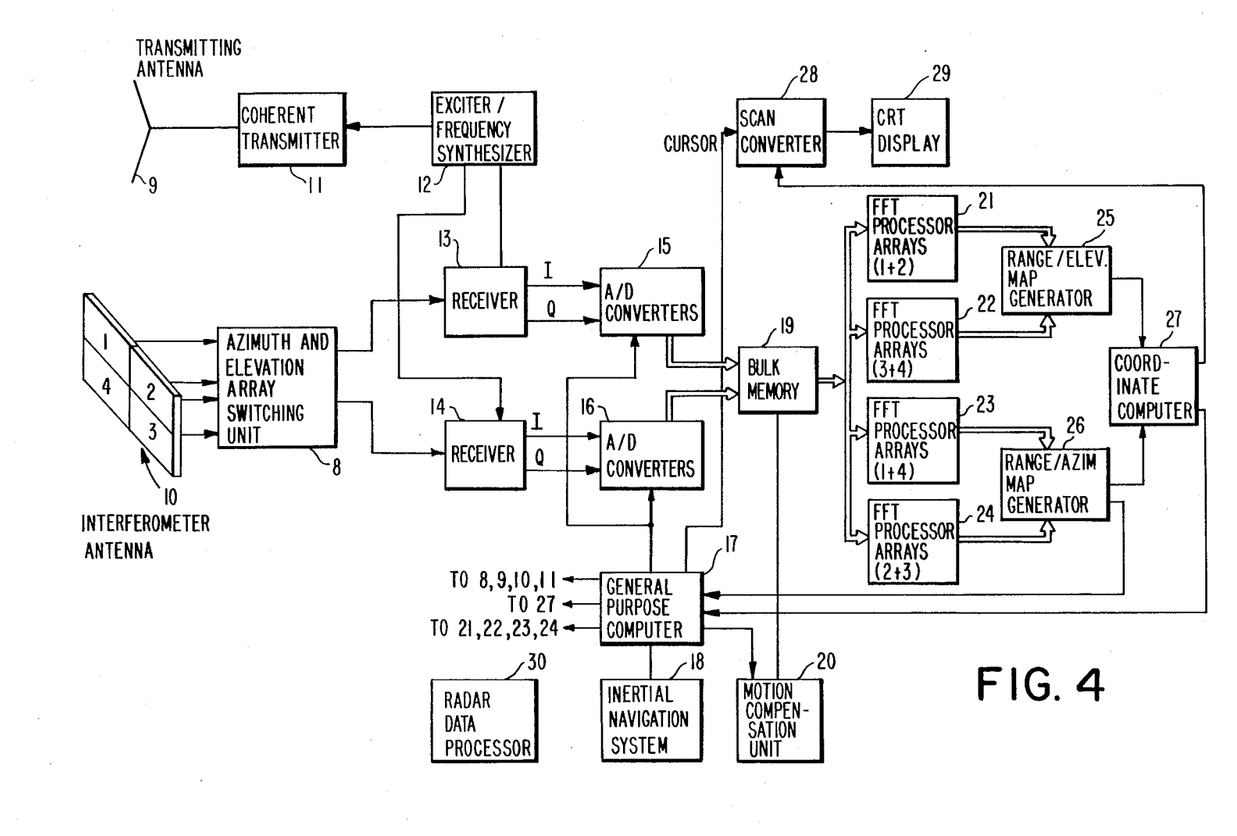
FIG. 4 is a block diagram illustrating the physical embodiments of the present invention.

Referring now to FIG. 4, a block diagram of the preferred embodiment of the system utilized for practicing the present invention is illustrated. The hardware and system description are identical to Boles, "Range/Azimuth/Elevation Ship Imaging For Ordnance Control" up to Coordinate Computer (27) shown in FIG. 7 therein. The system description to that point is repeated here for convenience, as follows: As shown in FIG. 4, pulses of electromagnetic energy generated in Coherent Transmitter 11 from reference signals derived in Exciter/Frequency Synthesizer 12 are radiated from Transmitting Antenna 9 so as to optimally illuminate a ship target under way on the surface of the sea. Signals reflected from the ship target are received by Interferometer Antenna 10 comprised of four separate receiving elements whose common boresight direction corresponds to that of Transmitting Antenna 9. Switching signals at the system pulse repetition frequency generated in General Purpose Computer 17 are applied to Azimuth and Elevation Array Switching Unit 8 for the purpose of combining signals received by the four antenna apertures so as to form interleaved azimuth and elevation signal pairs through two receiver channels (Receivers 13 & 14) for subsequent interferometric angle processing.

Accordingly, on odd pulse repetition intervals (pri's), the signals from antenna arrays 1 and 2 are coherently added in a microwave hybrid summing network located in Azimuth and Elevation Array Switching Unit 8, as are the signals from antenna Arrays 3 and 4, after which the two sums are separately inputted to Receivers 13 and 14, respectively, representing inputs to two separate synthetic arrays for elevation interferometric phase comparison. Similarly, on even pri's, signals from antenna arrays 1 and 4, as well as arrays 2 and 3 are separately added and inputted to Receivers 13 and 14, representing inputs to two separate synthetic arrays for azimuth interferometric phase comparison.

Reference signals from Exciter/Frequency Synthesizer 12, coherent with the transmitted signal, are applied to Receivers 13 and 14 to demodulate the alternating azimuth and elevation interferometer sums to quadrature related I and Q doppler shifted components, which represent the real and imaginary components of the instantaneous analog signal vectors out of the receivers. These analog signal components are digitized in the A/D Converters 15 and 16 at a sampling rate determined by system range resolution requirements. These resulting digitized samples are alternately sorted on a pulse-to-pulse basis and are stored in Bulk Memory 19 for the subsequent processing of 4 range/doppler matrices, two of which are requisite for elevation angle determination on a cell-by-cell basis, and two for azimuth. Concurrently, motion compensation corrections for antenna phase center translation and rotational motions, as well as for ship translational motion, are computed and stored in Motion Compensation Unit 20 in a time sequenced order on the basis of computations performed in General Purpose Computer 17 of the two-way line-of-sight displacement change between antenna phase centers and the tracking center-of-gravity of the ship, predicted on the regression solution obtained for the line-of-sight velocity error, $\epsilon_{y'xx}$, performed in Coordinate Computer 27.

At the end of the coherent integration interval for which data is being collected, corrections stored in Motion Compensation Unit 20 are applied to the time sequences stored in Bulk Memory 19 in the form of vector rotations reflecting the two-way motion compensation phase correction to each range sample of each pulse of the (4) sequences stored in Bulk Memory 19. After motion compensation correction, data is read out of Bulk Memory 19 (as new data is being entered) for Fourier Transform digital signal processing to produce the necessary filtering so as to provide the desired resolution along the doppler sensitive direction and in each range bin in accordance with Equations 27 and 26, wherein the solutions for $\dot{V}'_{yy}$ and $\dot{V}'_{zz}$ are obtained from Coordinate Computer 27. The filtering is performed in FFT Processors 21 through 24 which perform Fast Fourier Transform digital processing so as to produce doppler resolved coherently integrated vector sums in each filter of each range bin.

The processed outputs of FFT Processors 21 through 24 are seen to represent range/doppler resolved vectors representing, respectively, the net signal power in the upper (Arrays 1 and 2), lower (Arrays 3 and 4), left (Arrays 1 and 4) and right (Arrays 2 and 3) antenna sections throughout their respective sampled intervals. The range/doppler resolved vectors from FFT Processors 21 and 22 are inputted to Range/Elevation Map Generator 25 where a phase comparison is made between corresponding range/doppler cell outputs on a cell-by-cell basis, for each resolution cell, to yield the interferometric elevation angle of the signal received in each such resolution cell, in accordance with well known interferometric principles, and as denoted by Equation (13), i.e., $\Delta\eta = \sin^{-1}[(\lambda/2\pi d_e)\phi_e]$, where $\Delta\eta$ is the elevation angle with respect to antenna boresight, $d_e$ is the elevation interferometer baseline, and $\phi_e$ is the measured electrical phase shift between antenna sensing elements. Concurrently, and in an identical manner, the outputs of FFT Processors 23 and 24 are read into Range/Azimuth Map Generator 26 which produces the interferometric spatial azimuth angle $\overline{\Delta\theta}$, associated with each resolved range/doppler cell, in accordance with $\overline{\Delta\theta} = \sin^{-1}[(\lambda/2\pi d_a)\phi_a]$, (Equation 12), where $d_a$ and $\phi_a$ are azimuth interferometer baseline length, and measured electrical phase shift associated with each resolution cell, respectively.

The range/doppler/elevation angle coordinates from Range/Elevation Map Generator 25 and the range/doppler/azimuth angle coordinates from the Range/Azimuth Map Generator 26 (for each range/doppler resolved cell) are read into Coordinate Computer 27 where a weighted multivariate regression solution, using doppler, elevation, and azimuth angle variables, is performed for the regression constants, $\hat{a}$, $\hat{b}$, and $\hat{c}$, in accordance with Equations (22) through (25), from which the velocity constants, $\epsilon_{V'xx}$, $\hat{V}'_{yy}$, and $\hat{V}'_{zz}$, as specified by Equations (26) through (28), are computed in Coordinate Computer 27. The weight, $w_i$, applied to each coordinate $x_i$, $y_i$, and $z_i$ entering the regression solutions, is read into Coordinate Computer 27 from either of the FFT Processors 21-24 through either Range/Elevation Map Generator 25 or Range/Azimuth Map Generator 26.

The regression solution for $\epsilon_{V'xx}$ in Coordinate Computer 27 serves as a correction of $-\epsilon_{V'xx}$ to the line-of-sight velocity estimate. Updated line-of-sight velocity is applied to Motion Compensation Unit 20 which applies motion compensation phase corrections to data stored in Bulk Memory 19 for the purpose of image focussing and to drive the residual doppler in the boresight direction, assumed centered at the center of rotation of the ship, to zero, so as to avoid possible doppler foldovers which could have a disturbing influence on the doppler/azimuth/elevation coordinate data provided to the Coordinate Computer 27 for regression analysis. The remaining two velocity estimates, $\hat{V}'_{yy}$ and $\hat{V}'_{zz}$, are used in General Purpose Computer 17 to compute doppler bandwidth, and integration time, for the formation of the next aperture, so as to achieve a prescribed resolution of $d_{res}$ along the doppler sensitive direction.

Figure 5:
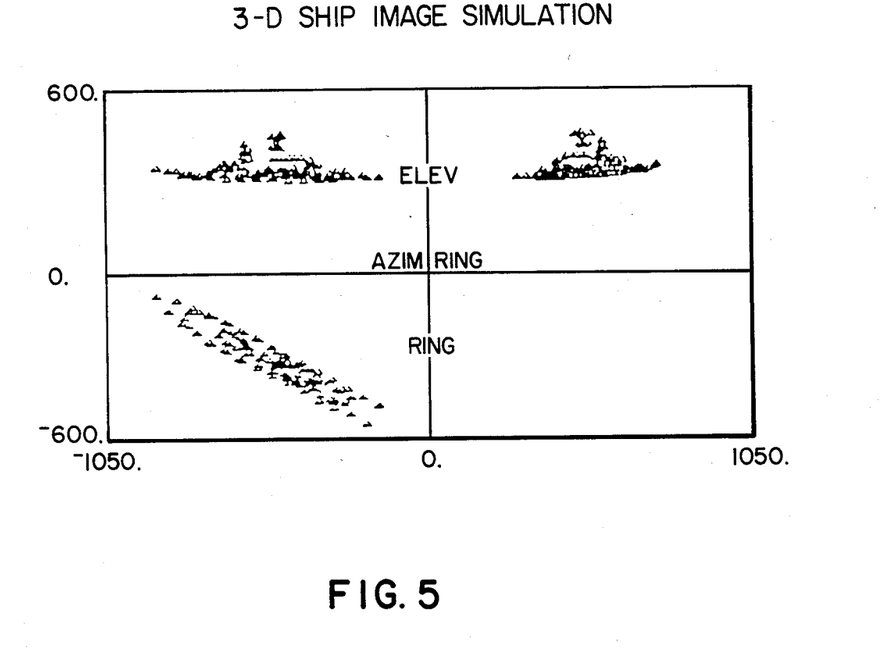
FIG. 5 illustrates the image simulation of a split screen CRT showing three orthogonal projections of a ship target.

The novelty of the present invention proceeds from this point on and is seen as follows:

At the completion of each aperture, quantized frequency and range, as well as interferometrically determined elevation and azimuth angles generated in Range/Elevation Map Generator 25 and Range/Azimuth Map Generator 26 are stored in Coordinate Computer 27. In order to perform the regression as dictated by Equations (22) through (25), an estimate of the angle $\psi$ (Equation (21)) is required by Equation (20) for the variable r, which is requisite to solving Equations (22) through (26). Since $\psi$ depends upon an estimate of the output b, defined by $-V'_{yy}/V'_{zz}$, and which is derivable from a smoothed history of the output data, this dependency of input upon output has the potential for producing instability or runaway (of the regression solution errors) in a short period of time. This potential problem is circumvented by iterating $\psi$ of sufficient extent so as to subtend the value of b governing the data taken for the present aperture, performing the regression solution for each such $\psi$, computing the sum of the weighted residuals using Equations (15) & (16), and then selecting that regression solution for which the sum of the weighted residuals from Equation (16) is minimum, thereby assuring that the corresponding value of $\psi$ was the proper and optimum choice, and divorced of any dependency upon output history. The rotational velocities $\overline{W}_{yy}$ and $\overline{W}_{zz}$ so obtained are stored in Coordinate Computer 27, as are aperture weighting, range, frequency, azimuth, and elevation angles for all scatterers above a prescribed signal threshold. After a prescribed period of such data collection (i.e., 6 seconds), a third degree weighted least squares polynomial curve fit, as denoted by Equation (29) is performed on the collected $\overline{W}_{yy}$ and $\overline{W}_{zz}$ data in Coordinate Computer 27. Response frequencies are determined using an interpolation routine carried out in Coordinate Computer 27, followed by scatterer sorting and precision frequency determination using third degree polynomial curve fits, similar in form to Equation (29). Scatterer acceleration is derived from differentiating the frequency polynomial in Coordinate Computer 27. Sorted azimuth and elevation angle data is similarly curve fitted in Coordinate Computer 27 in accordance with Equation (32), as is the elevation angle time derivative as prescribed by Equation (33) for a number of the brightest scatterers, (i.e., 10). Equation (31) is applied (in Coordinate Computer 27) for each of the 10 scatterers, and an averaged $W_{LOS}$ is derived therefrom. The time derivatives, $\overline{W}_{yy}$ and $\overline{W}_{zz}$ are computed by Equation (30) and finally the scatterer coordinates, $x_j$, $y_j$, and $z_j$, as prescribed by Equations (5) through (9). The scatterer coordinates are transferred from Coordinate Computer 27 to Scan Converter 28 for display on a split screen devided into four quadrants in CRT Display 29. These are range/azimuth, azimuth/elevation, and range/elevation coordinate values, representing three orthogonal image projections of the ship target. An illustration of such image projections derived from computer simulation is shown in FIG. 5.

As described in Boles, "Range/Azimuth/Elevation Ship Imaging for Ordnance Control", ship translational motion must be tracked so that antenna boresight and range swath start bear a constant relationship with respect to the ship. Interferometric azimuth angle data from each useful ship resolution cell are averaged on an array-to-array basis. The solution for aircraft to ship relative range rate is tracked so as to advance or retard the range swath start trigger in accordance with ship as well as aircraft motion, so that corresponding ship range increments correspond from pulse-to-pulse. Correspondingly, range rate and azimuth rate corrections are applied by the system computer (General Purpose Computer 17) so as to also steer antenna boresight in both azimuth and elevation in accordance with both ship and aircraft translational motions. All task management such as data transmission, initiation of subroutine sequences, etc., are performed by Radar Data Processor 30.

On the basis of computer simulation cited above, in which the techniques of Boles, "Range/Azimuth/Elevation Ship Imaging For Ordnance Control" and those of the present invention were both modeled, approximately a 50% increase in stand-off range for equivalent ship imaging performance is achievable with the present invention over the former.

It is to be noted that the optimum time duration over which data is stored for polynomial curve fitting to obtain the essential motional parameters should be adapted to the actual periodicity of ship rotational motion. The quantities illustrated herein, therefore, are by way of example, reasonable estimates for a cruiser type vessel.

While illustrative embodiments of the subject invention have been described and illustrated, it is obvious that various changes and modifications can be made therein without departing from the spirit of the present invention which should be limited only be the scope of the appended claims.

What is claimed is:

1. A method for forming high resolution synthetic aperture radar imagery of a ship target under the influence of sea state conditions comprising the steps of:
   (a) processing signals received from ship scatterers comprising the ship target to obtain estimates of (1) range, velocity, and acceleration of ship scatterers, and (2) ship rotational velocities and rotational velocity rates;
   (b) determining from these estimated ship scatterer motional parameters the coordinate values of the ship scatterer centers to form a high resolution image of the ship target; and
   (c) displaying the formed imagery of the ship target including a range/azimuth projection, an elevation/azimuth profile projection, and a range/elevation profile projection.

2. A method as recited in claim 1 wherein the step of processing the received signals includes:
   (a) Determining scatterer velocities from polynomial curve fitting to interpolated and sorted doppler processed frequency measurements over a prescribed tracking time interval; and
   (b) determining scatterer accelerations from the time derivatives of polynomial curve fits to frequency data.

3. A method as recited in claim 1 wherein the step of processing the received signal includes:
   (a) performing a weighted multivariate regression fit to processed doppler, azimuth, and elevation angle measurements to obtain cross-line-of-sight ship rotational velocities using an iterative process of minimizing error residuals; and
   (b) determining line-of-sight ship rotational velocity using sorted azimuth and elevation angle measurements, in conjunction with elevation angle rates determined for several bright scatterers and estimated cross-line-of-sight ship rotational velocity.

4. A method as recited in claim 3 where the step of processing the received signals includes:
   (a) obtaining cross-line-of-sight ship rotational velocity rates from time derivatives of polynomial curve fits to stored estimates of the cross-line-of-sight rotational velocities derived from regression solutions.

5. A method of claim 3 wherein said doppler, azimuth and elevation angle measurements are determined from Fourier transform signal processing using an antenna angle sensing system.

6. A method of claim 5 wherein the antenna system is an interferometric antenna system.

7. A method of claim 5 wherein the antenna system is a phase monopulse antenna system.

8. An airborne synthetic aperture radar system for forming high resolution synthetic aperture radar imaging of a ship target under the influence of sea state conditions, said system comprising:
   (a) a multiple section interferometer antenna connected to a two channel receiver;
   (b) means coupled to said receiver for processing signals received by said antenna from ship scatterers comprising the ship target to obtain estimates of (1) range, velocity, and acceleration of ship scatterers, and (2) ship rotational velocities and rotational velocity rates;
   (c) means for determining from these estimated ship scatterer motional parameters the coordinate values of the ship scatterer centers to form a high resolution image of the ship target; and
   (d) means for displaying the formed imagery of the ship target including a range/azimuth projection, an elevation/azimuth profile projection, and a range/elevation profile projection.

9. The system of claim 8 wherein said processing means includes:
   (a) means for determining scatterer velocities from polynomial curve fitting to interpolated and sorted doppler processed frequency measurements over a prescribed tracking time interval; and
   (b) means for determining scatterer accelerations from the time derivatives of polynomial curve fits to frequency data.

10. The system of claim 8 wherein said processing means includes:
    (a) means for performing a weighted multivariate regression fit to processed doppler, azimuth, and elevation angle measurements to obtain cross-line-of-sight ship rotational velocities using an iterative process of minimizing error residuals; and
    (b) means for determining line-of-sight ship rotational velocity using sorted azimuth and elevation angle measurements, in conjunction with elevation angle rates determined for several bright scatterers and estimated cross-line-of-sight ship rotational velocity.

11. The system of claim 10 wherein said processing means includes means for obtaining cross-line-of-sight ship rotational velocity rates from time derivatives of polynomial curve fits to stored estimates of the cross-line-of-sight rotational velocities derived from regression solution.

12. An airborne synthetic aperture radar system for forming high resolution synthetic aperture radar imaging of a ship target under the influence of sea state conditions, said system comprising:
    (a) means for processing the received signals from ship scatterers (1) using polynomial curve fitting to interpolated and sorted doppler processed frequency measurements over a prescribed tracking time interval to yield scatterer velocities; (2) determining scatterer accelerations from the derivatives of polynomial curve fits to frequency data; (3) performing a weighted multivariate regression fit to processed doppler, azimuth, and elevation angle measurements to obtain the two cross-line-of-sight ship rotational velocities using an iterative process of minimizing error residuals; (4) determining the line-of-sight ship rotational velocity using sorted azimuth, elevation, and elevation angle rates determined for several bright scatterers, in conjunction with estimated horizontal cross-line-of-sight ship rotational velocity; (5) obtaining the two cross-line-of-sight ship rotational velocity rates from the time derivatives of polynomial curve fits to stored estimates of the two cross-line-of-sight rotational velocities derived from regression solutions; and (6) determining from the estimated scatterer velocity and acceleration, and the estimated ship rotational parameters, the coordinate values of the ship scattering centers; and (b) means for displaying the formed imagery of the ship target including a range/azimuth projection, an azimuth/elevation profile projection, and a range/elevation profile projection.

* * * * *

UNITED STATES PATENT AND TRADEMARK OFFICE
CERTIFICATE OF CORRECTION

PATENT NO. : 4,723,124
DATED : February 2, 1988
INVENTOR(S) : Sol Boles

It is certified that error appears in the above-identified patent and that said Letters Patent is hereby corrected as shown below:

In Fig. 4 and the first page of the patent, the line between boxes 12 & 13 should have an arrowhead terminating at Box 13.

In Fig. 4 and the first page of the patent, the line between boxes 17 & 17 should have an arrowhead terminating at Box 17.

In Fig. 4 of the first page of the patent, the line between boxes 19 & 20 should have an arrowhead terminating at Box 19.

In Fig. 5 of the patent: "RING" should read as --RNG--

UNITED STATES PATENT AND TRADEMARK OFFICE
CERTIFICATE OF CORRECTION

PATENT NO. : 4,723,124

DATED : February 2, 1988

INVENTOR(S) : Sol Boles

Page 2 of 3

It is certified that error appears in the above-identified patent and that said Letters Patent is hereby corrected as shown below:

Column 2, line 66: "point scattered" should read as --point scatterer--

Column 3, line 35: "$\rho \equiv \overline{W}_{zz} + \overline{W}_{yy} W_{LOS}$" should read as --$\rho \equiv \dot{\overline{W}}_{zz} + \overline{W}_{yy} W_{LOS}$--

Column 3, line 16: "$dz = -(\overline{W}_{yy} X dt + W_{LOS\,y}\, dt).$" should read as --$dz = -(\overline{W}_{yy} x dt + W_{LOS\,y}\, dt).$--

Column 5, line 2: "$1\sigma^2 az$" should read as --$1/\sigma^2 az$--

Column 5, line 63: "$\hat{V}'_{zz} = \frac{\lambda}{\hat{2c}}$" should read as --$\hat{V}'_{zz} = \frac{\lambda}{2\hat{c}}$--

UNITED STATES PATENT AND TRADEMARK OFFICE
CERTIFICATE OF CORRECTION

PATENT NO. : 4,723,124

DATED : February 2, 1988

INVENTOR(S) : Sol Boles

Page 3 of 3

It is certified that error appears in the above-identified patent and that said Letters Patent is hereby corrected as shown below:

Column 6, line 21: "$\hat{V}'_{yy}/R_c$ respectively" should read as --$\hat{V}'_{yy}/R_o$ and $\hat{V}'_{zz}/R_o$ respectively--

Column 7, line 47: "$\dot{y} = a_1 + 2a_2 t$" should read as --$\dot{\gamma} = a_1 + 2a_2 t$--

Column 9, line 52: "$V'_{zz}$" should read as --$\hat{V}'_{zz}$--

Signed and Sealed this

Twenty-fifth Day of October, 1988

Attest:

DONALD J. QUIGG

Attesting Officer

Commissioner of Patents and Trademarks